UNITED STATES PATENT OFFICE.

ERNST KÖNIG, OF HÖCHST-ON-THE-MAIN, GERMANY, ASSIGNOR TO THE FARB-WERKE, VORMALS MEISTER, LUCIUS & BRÜNING, OF SAME PLACE.

RED-VIOLET BASIC DISAZO DYE.

SPECIFICATION forming part of Letters Patent No. 602,640, dated April 19, 1898.

Application filed May 6, 1897. Serial No. 635,399. (Specimens.)

*To all whom it may concern:*

Be it known that I, ERNST KÖNIG, doctor of philosophy, a citizen of the Empire of Germany, residing at Höchst-on-the-Main, Germany, have invented certain new and useful Improvements in the Manufacture of a Reddish-Violet Dyestuff, of which the following is a specification.

This invention relates to a reddish-violet basic disazo dyestuff which is obtained by the action of diazotized meta-trimethyl ammonium phenyl-azo-meta-amido-para-cresol-ethyl ether upon beta-naphthol.

The reaction is set out in the following equation:

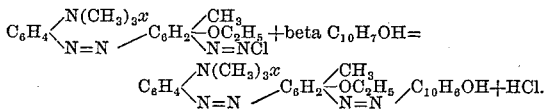

The letter $x$ in the foregoing formula means chlorin or an equivalent radical of an acid.

The process is, for instance, as follows: 52.1 kilos of the zinc chlorid double salt of meta-trimethyl ammonium phenyl-azo-meta-amido-para-cresol-ethyl ether hydrochlorid are brought into suspension with about nine hundred liters of water and diazotized by the addition of twenty kilos hydrochloric acid of 20° Baumé and 6.9 kilos of sodium nitrate. The diazo solution is run into an aqueous solution of 14.4 kilos of beta-naphthol and four kilos of caustic soda, to which are added fifteen kilos of acetate of sodium. When the combination is completed, the whole is heated and the dyestuff is separated from the filtered solution with common salt.

The dyestuff thus obtained has the following properties: It forms a brown powder soluble in water with a cherry-red color. The addition of soda or soda-lye changes the solution to carmin red. Hydrochloric acid renders it somewhat yellower. It is soluble in alcohol, ether, benzene, and petroleum ether and dissolves in concentrated sulfuric acid with a green color.

The dyestuff dyes tanned and untanned cotton, as well as half-wool, in an even reddish-violet color in an acid-bath.

Having thus described my invention, I claim as new and desire to secure by Letters Patent—

As a new product, the reddish-violet dyestuff obtained from diazotized meta-trimethyl ammonium phenyl-azo-meta-amido-para-cresol-ethyl ether and beta-naphthol, being a brown powder, soluble in water with a cherry-red color, soluble in alcohol, ether, benzene and petroleum ether, and dyeing tanned and untanned cotton, as well as half-wool a reddish violet in an acid-bath, substantially as set forth.

In testimony that I claim the foregoing as my invention I have signed my name in presence of two subscribing witnesses.

ERNST KÖNIG.

Witnesses:
HEINRICH HAHN,
ALFRED BRISBIN.